US011961278B2

(12) United States Patent
Liu et al.

(10) Patent No.: US 11,961,278 B2
(45) Date of Patent: Apr. 16, 2024

(54) METHOD AND APPARATUS FOR DETECTING OCCLUDED IMAGE AND MEDIUM (71) Applicant: BEIJING XIAOMI PINECONE ELECTRONICS CO., LTD., Beijing (CN)

(72) Inventors: Ruoyu Liu, Beijing (CN); Zhi Qu, Beijing (CN); Yasen Zhang, Beijing (CN); Yan Song, Beijing (CN); Zhipeng Ge, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 331 days.

(21) Appl. No.: 17/334,941

(22) Filed: May 31, 2021

(65) Prior Publication Data
US 2022/0101028 A1 Mar. 31, 2022

(30) Foreign Application Priority Data

Sep. 28, 2020 (CN) .......................... 202011054873.2

(51) Int. Cl.
G06V 10/774 (2022.01)
G06F 18/214 (2023.01)
(Continued)

(52) U.S. Cl.
CPC .......... *G06V 10/454* (2022.01); *G06F 18/214* (2023.01); *G06F 18/2413* (2023.01); *G06N 3/045* (2023.01); *G06N 3/088* (2013.01); *G06V 10/764* (2022.01); *G06V 10/774* (2022.01); *G06V 10/82* (2022.01); *G06V 20/00* (2022.01)

(58) Field of Classification Search
CPC ..... G06F 18/214; G06V 10/764; G06N 3/088
See application file for complete search history.

(56) References Cited

U.S. PATENT DOCUMENTS 10,311,335 B1\* 6/2019 Kim ..................... G05D 1/0088
2020/0279105 A1 9/2020 Muffat et al.

FOREIGN PATENT DOCUMENTS

CN 109951635 A \* 6/2019
JP 2019110474 A 7/2019
(Continued)

OTHER PUBLICATIONS

N. Ud Din et al., "Effective Removal of User-Selected Foreground Object From Facial Images Using a Novel GAN-Based Network" Jun. 2020, IEEE Access, vol. 8, pp. 109648-109661 (Year: 2020).\*
(Continued)

*Primary Examiner* — Vincent Rudolph
*Assistant Examiner* — Nicholas Crespo Stazer
(74) *Attorney, Agent, or Firm* — COZEN O'CONNOR (57) ABSTRACT A method for detecting an occluded image. The method includes: after an image is captured by a camera, obtaining the image as an image to be detected; inputting the image to be detected into a trained occluded-image detection model, the occluded-image detection model is trained based on original occluded images and non-occluded images by using a trained data feature augmentation network; determining whether the image to be detected is an occluded image based on the occluded-image detection model; and outputting an image detection result.

9 Claims, 5 Drawing Sheets (51) Int. Cl.
*G06F 18/2413* (2023.01)
*G06N 3/045* (2023.01)
*G06N 3/088* (2023.01)
*G06V 10/44* (2022.01)
*G06V 10/764* (2022.01)
*G06V 10/82* (2022.01)
*G06V 20/00* (2022.01)

(56) References Cited

FOREIGN PATENT DOCUMENTS

| WO | WO 2020065908 A1 | 4/2020 | | |
|---|---|---|---|---|
| WO | WO-2021055457 A1 * | 3/2021 | ............... | G06K 9/22 |
| WO | WO-2021114866 A1 * | 6/2021 | ............... | G06K 9/46 |

OTHER PUBLICATIONS

European Patent Application No. 21176559.9 extended Search and Opinion dated Nov. 10, 2021, 10 pages.
Dong, J. et al. "Occlusion-Aware GAN For Face De-Occlusion In The Wild" 2020 IEEE Int'l Conference on Multimedia and Expo; Jul. 6, 2020; 6 pages.
Japanese Patent Application No. 2021-083271, Office Action dated Jun. 28, 2022, 4 pages.
Japanese Patent Application No. 2021-083271, English translation of Office Action dated Jun. 28, 2022, 4 pages.

* cited by examiner

METHOD AND APPARATUS FOR DETECTING OCCLUDED IMAGE AND MEDIUM

CROSS-REFERENCE TO RELATED APPLICATION

This application is based upon and claims priority to Chinese Patent Application Serial No. 202011054873.2, filed on Sep. 28, 2020, the entire content of which is incorporated herein by reference.

TECHNICAL FIELD

The present disclosure generally relates to a field of camera control, and more particularly, to a method for detecting an occluded image and a medium.

BACKGROUND

Data augmentation is a technology that uses limited data to generate more equivalent data and is a technology to improve the accuracy and generalization ability of deep network models, playing an important role in computer vision tasks such as image classification, object recognition and semantic segmentation. Most of the present data augmentation technologies adopt image transformation methods, such as rotation, cropping, affine transformation and color dithering.

When a user holds a mobile phone to take a horizontal photo, the edge of the lens may sometimes be blocked by a finger due to shooting habits and other reasons, resulting in a small blocked area at the edge of the photo. Since oftentimes this type of occlusion is not noticed in real time, the user usually does not re-shoot, thus leaving behind regret for not having a perfect photo. The task of occlusion detection is to determine whether a photo is occluded immediately after the photo is taken, and to prompt the user to re-shoot in real time if an occluded image is detected.

SUMMARY

According to an aspect of embodiments of the present disclosure, there is provided a method for detecting an occluded image, including: after an image is captured by a camera, obtaining the image as an image to be detected; inputting the image to be detected into a trained occluded-image detection model, in which the occluded-image detection model is trained based on original occluded images and non-occluded images by using a trained data feature augmentation network; determining whether the image to be detected is an occluded image based on the occluded-image detection model; and outputting an image detection result.

According to an aspect of embodiments of the present disclosure, there is provided a device for detecting an occluded image, including: a processor; and a memory configured to store instructions executable by the processor. The processor is configured to: after an image is captured by a camera, obtain the image as an image to be detected; input the image to be detected into a trained occluded-image detection model, in which, the occluded-image detection model is trained based on original occluded images and non-occluded images by using a trained data feature augmentation network; determine whether the image to be detected is an occluded image based on the occluded-image detection model; and output an image detection result.

According to an aspect of embodiments of the present disclosure, there is provided a non-transitory computer-readable storage medium having stored therein instructions that, when executed by a processor of a router, causes the router to perform a method for detecting an occluded image, the method includes: after an image is captured by a camera, obtaining the image as an image to be detected; inputting the image to be detected into a trained occluded-image detection model, the occluded-image detection model is trained based on original occluded images and non-occluded images by using a trained data feature augmentation network; determining whether the image to be detected is an occluded image based on the occluded-image detection model; and outputting an image detection result.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

When a user holds a mobile phone to take a horizontal photo, the edge of the lens may sometimes be blocked by a finger, such that there may be a small blocked area at the edge of the photo. Since oftentimes this type of occlusion is not noticed in real time, the user usually does not re-shoot, thus fails to obtain a perfect picture, leaving behind regret. A task of occlusion detection is to determine whether a photo is occluded immediately after the photo is taken, and to prompt the user to re-shoot in real time if an occluded image is detected.

During the occlusion detection, the occluded image needs to be collected by manually simulating the real scene. Since an occluded area in the real scene occupies a small area of the photo at a remote location, the collection requires a lot of manpower. At the same time, the present data augmentation methods cannot generate effective training data due to the distortion of the occluded area. Therefore, these methods are not suitable for occlusion detection tasks.

Currently, to overcome above problems, a training way of generating a new image and directly adding the image, as a certain type of sample, into a model is proposed. However, this way may have following problems. (1) This type of algorithm cannot effectively generate images with strict semantic content such as a finger occlusion area, so it is not suitable for finger occlusion detection tasks. (2) Directly generating an image requires a generation network and an identifying network to have a large number of parameters, which may increase the computational cost and time cost of network training.

The present disclosure provides a method for detecting an occluded image. In this method, after an image is captured by a camera, the image is taken as an image to be detected, and is input into a trained occluded-image detection model. And then it is determined whether the image to be detected is an occluded image by the occluded-image detection model, and an image detection result is output. The occluded-image detection model is trained based on original occluded images and non-occluded images by using a trained data feature augmentation network.

The method according to the present disclosure may be suitable for the following application scenarios.

(1) It is difficult to obtain images of positive samples (blocked or occluded by fingers), which requires a lot of time and labor costs.

(2) It is not easy to augment the positive samples by using simple data augmentation techniques. When a new image is generated from an original image by means of cropping, deformation, and adding noise, the finger part of an occluded image may be destroyed, and distortion may be caused, thus the part occluded by a finger does not match the real situation.

(3) It is difficult to generate the images of positive samples using a generation adversarial network, a lot of detail information may be lost, and a lot of noise may be introduced, thus causing the accuracy of the model to decline. This is because in some application scenarios, finger occlusion detection has high requirements for data and is very sensitive to data distribution of the occluded image. However, the use of generation adversarial network technology cannot truly simulate the generation of finger occlusion images.

(4) The present generative image augmentation algorithms have a large network scale and require a large amount of training data, so they need a large amount of storage and computing resources, which is not conducive to large-scale training.

The method according to the present disclosure may be applied to an electronic product having a camera, such as a mobile phone, a PAD (portable android device), a wearable device.

Figure 1:
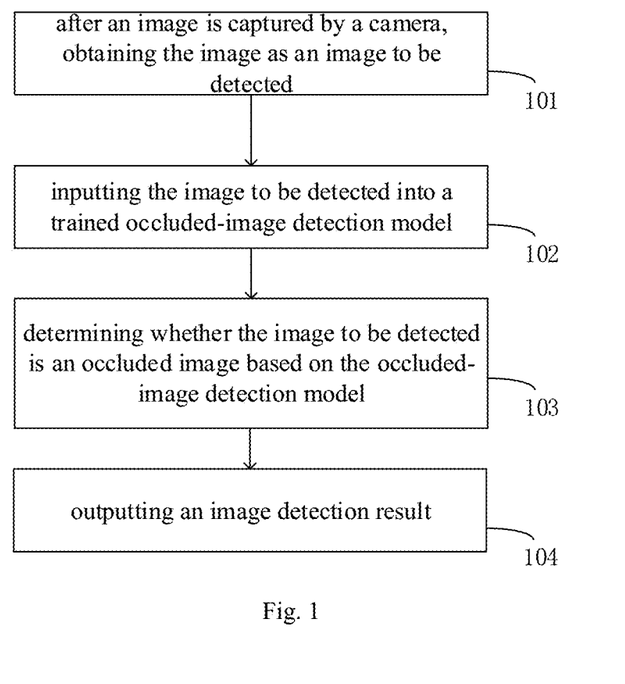
FIG. 1 is a flow chart showing a method for detecting an occluded image according to an exemplary embodiment.

The present disclosure provides a method for detecting an occluded image. FIG. 1 is a flow chart showing a method for detecting an occluded image according to an exemplary embodiment. The method includes following actions.

At block 101, after an image is captured by a camera, the image is obtained as an image to be detected.

At block 102, the image to be detected is input into a trained occluded-image detection model. The occluded-image detection model is trained based on original occluded images and non-occluded images by using a trained data feature augmentation network.

At block 103, it is determined whether the image to be detected is an occluded image based on the occluded-image detection model.

At block 104, an image detection result is output.

In this method, the image captured by a camera is obtained and taken as the image to be detected. And then, the image to be detected is input into the trained occluded-image detection model. It is determined whether the image to be detected is the occluded image based on the trained occluded-image detection model. It may be known to those skilled in the art that, after training, the occluded-image detection model may learn about occlusion characteristics about the image.

The occluded-image detection model is trained based on the original occluded images and the non-occluded images by using the trained data feature augmentation network. When training the occluded-image detection model, the data feature augmentation network is trained based on the original occluded images, so that the data feature augmentation network may synthesize a generation feature which is close to an original feature of an image, i.e., synthesizing the generation feature based on an original non-occluded image and a mask image. And then, an original feature of each original occluded image is obtained based on an original occluded image. The occluded-image detection model is trained based on the synthesized generation features and the obtained original features.

The image feature herein generally refers to an output obtained by inputting an image into a feature network for processing. It is equivalent to a representation form of high-level semantic information obtained after the image is compressed.

By using the above method, when synthesizing the generation feature, a generative model is stably trained by using a small number of occluded images with a mask annotation, to synthesize the generation features. So that a problem of insufficient positive samples in the training of occlusion detection model may be effectively solved, and a lot of cost for collecting positive samples may be saved. In addition, the generation feature is synthesized herein, that is, a high-level feature of the occluded image is synthesized. In this way, the influence of noise on the model accuracy caused by the lack of detail in image generation can be effectively avoided. Therefore, the accuracy rate of detection may be significantly improved after adding the synthesized feature in training.

In addition, in this method, the generation feature, rather than an occluded image, is synthesized based on the data feature augmentation network. This may reduce the model part of a process from an image to a feature. Therefore, the network model in this method is much smaller than the network model for generating an image.

During the training of the occluded-image detection model, training data sets are divided into multiple batches, and a gradient descent algorithm is used to train the model until a loss function converges. This training process can be realized by those skilled in the art using the existing training methods, which is not repeated herein.

The method for synthesizing the generation feature based on the occluded image marked by a mask may be described in combination with following embodiments.

In some alternative embodiments, the method further includes the following.

The original occluded images and the non-occluded images are obtained.

The data feature augmentation network is trained based on the original occluded images.

The occluded-image detection model is trained based on the original occluded images and the non-occluded images by using the trained data feature augmentation network.

As mentioned above, the occluded-image detection model is trained based on the original occluded images and the non-occluded images by using the trained data feature augmentation network. Therefore, the data feature augmentation network is firstly trained before training the occluded-image detection model. In this embodiment, the data feature augmentation network is trained based on the obtained original occluded images. The trained data feature augmentation network may synthesize the generation feature which is close to the original feature of an image.

In this way, the problem of insufficient positive samples in the training of the occlusion detection model may be solved, and a lot of cost for collecting the positive samples may be saved. In addition, by synthesizing the high-level features of the occluded image, the influence of noise on the model accuracy caused by the lack of detail in image generation can be effectively avoided.

In an alternative embodiment, training the data feature augmentation network based on the original occluded images may include the following.

A finger template image and a non-finger image are generated based on each original occluded image. The finger template image is obtained by removing an area not occluded by a finger from an original occluded image, and the non-finger image is obtained by removing an area occluded by the finger from the original occluded image.

A plurality of training data sets are generated. Each training data set includes one finger template image, one non-finger image and one original occluded image. Multiple training data sets are used to train the data feature augmentation network in each round of training.

Figure 2:
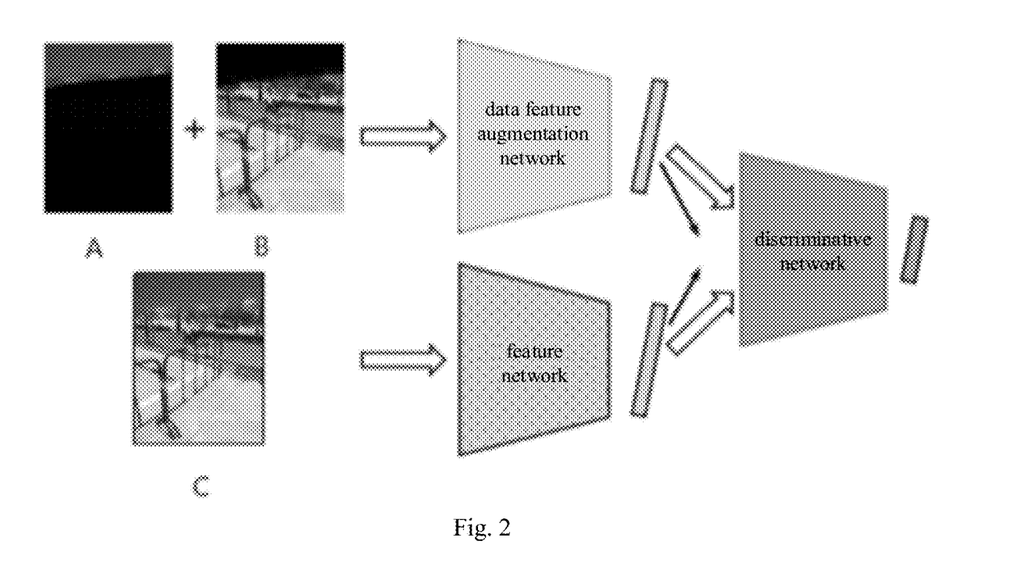
FIG. 2 is a schematic diagram illustrating training a data feature augmentation network according to an exemplary embodiment.

FIG. 2 illustrates a process of training a data feature augmentation network according to an exemplary embodiment. A represents a finger template image, B represents a non-finger image, and C represents an original occluded-by-finger image. As mentioned above, the feature network is included in the occluded-image detection model. The generation feature synthesized by the data feature augmentation network and the original feature of the occluded image extracted by the feature network are input into a discriminative network. The discriminative network is used to assist to train the data feature augmentation network. That is, the difference between the synthesized generation feature and the original feature is reduced during the training process, thus extended generation features are obtained through the data feature augmentation network. The discriminative network is used to train the data feature augmentation network, not to train the occluded-image detection model.

In an alternative embodiment, generating the finger template image and the non-finger image based on each original occluded images includes the following.

Mask data is obtained based on each original occluded image. The mask data indicates an occluded location in an original occluded image.

The finger template image and the non-finger image are generated based on the original occluded image and the mask data.

For example, the process of generating the finger template image and the non-finger image based on each original occluded image may be implemented based on the mask data of the original occluded image. After obtained the original occluded images, the mask of the finger part in each image is manually labeled, thus occluded image data and the mask data are obtained. The mask data represents an image with the same size as the original occluded image, the occluded area labeled as 1, and the non-occluded-by-finger area labeled as 0. For each image composed of an original occluded image and corresponding mask data, the size of the original occluded image and corresponding mask data are consistent with each other, and the positions of each pixel in the original occluded image and in the corresponding mask data are consistent with each other after cropping and alignment operations. The finger template image is obtained by setting pixels in the non-occluded area of the original occluded image to 0 according to the mask data, and the non-finger image is obtained by setting pixels in the area occluded by the finger of the original occluded image to 0 according to the mask data.

The number of original occluded images is far smaller than the number of non-occluded images, therefore, it does not need to take too much manpower for manual annotation. By this method, a large number of generation features can be synthesized to supplement the deficiency of the original features of the occluded images.

In an alternative embodiment, training the data feature augmentation network based on the original occluded images further includes the following.

The finger template image and the non-finger image are input into the data feature augmentation network to generate a generation feature of the original occluded image.

The original occluded image is input into a feature network to extract an original feature of the original occluded image. The occluded-image detection model includes the feature network.

The generation feature and the original feature of each original occluded image are input into a discriminative network for training.

A loss function of the data feature augmentation network and a loss function of the discriminative network in each round of training are obtained.

It is determined that the training of the data feature augmentation network is finished when both the loss function of the data feature augmentation network and the loss function of the discriminative network converge.

As mentioned above, the finger template image, the non-finger image and an original occluded image compose a set of training data. The finger template image and the non-finger image are generated based on the original occluded image and the mask data, therefore, the finger template image, the non-finger image, the mask data and the original occluded image may compose a set of training data. That is, the data feature augmentation network is trained based on multiple sets of training data. Several sets of training data are randomly selected in each round of training of the data feature augmentation network to perform a round of training of the data feature augmentation network. The loss function of the data feature augmentation network and the loss function of the discriminative network are obtained during the training process. When the loss functions converge, the training of the data feature augmentation network is completed. For example, the loss function herein may be an adversarial loss function of Hinge version, which is not repeated herein.

In an alternative embodiment, training the occluded-image detection model based on original occluded images and non-occluded images by using a trained data feature augmentation network may include the following.

A processed non-occluded image is obtained based on the mask data and the non-occluded image. The processed non-occluded image is obtained by removing an area corresponding to the mask data from the non-occluded image.

The finger template image and the processed non-occluded image are input into the trained data feature augmentation network to generate a generation feature of the non-occluded image.

The original occluded image is input into a feature network to extract an original feature of the original occluded image, the occluded-image detection model including the feature network.

The generation feature of the non-occluded image and the original feature of the original occluded image are input into a classification network for training, the occluded-image detection model including the classification network.

It is determined that the training of the data feature augmentation network is finished when a loss function of the occluded-image detection model converges.

Figure 3:
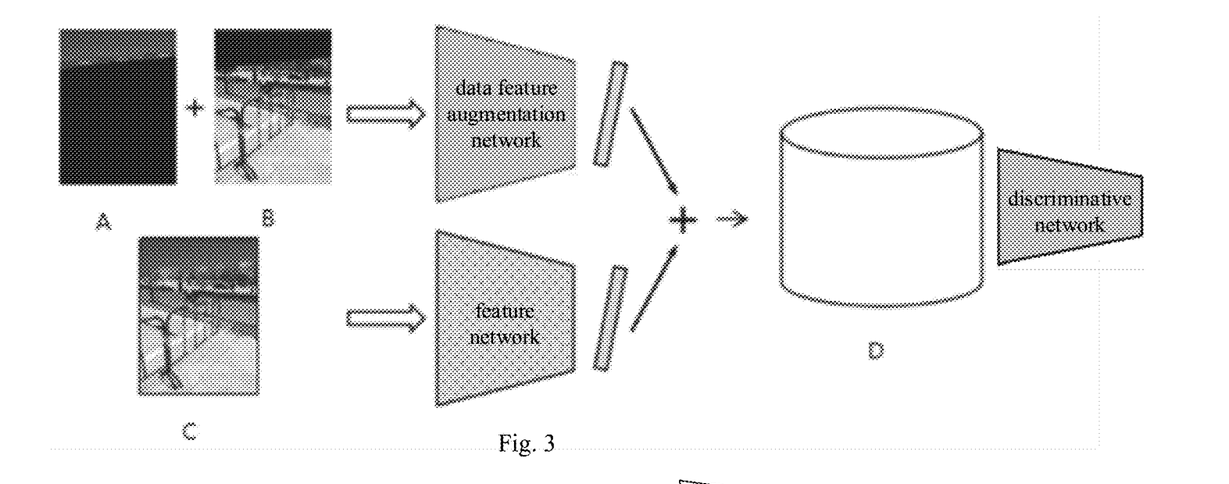
FIG. 3 is a schematic diagram illustrating training an occluded-image detection model according to an exemplary embodiment.

The training process of the occluded-image detection model in this embodiment may refer to FIG. 3. FIG. 3 illustrates a process of training an occluded-image detection model, in which a data feature augmentation network, a feature network, and a classification network (also called as a discriminative network) are included. The occluded-image detection model includes the feature network and the classification network. The data feature augmentation network is used to synthesize an augmented feature, i.e., the generation feature. The augmented feature herein is used to improve the accuracy of discriminating an image feature by the network. The feature network is used to extract the image feature. The classification network is used to classify an image feature. A represents a finger template image, B represents a non-finger image, C represents an original occluded image, and D represents an augmented feature set. The generation feature is synthesized by the data feature augmentation network. The original feature of the original occluded image is obtained by the feature network. The synthesized features and the original features constitute the augmented feature set for training the occluded-image detection model. In detail, during training, a gradient descent algorithm may be used for the training until the loss function of the occluded-image detection model converges. It may be known that, the loss function of the occluded-image detection model herein may be a loss function optimized for both the feature network and the classification network.

Figure 4:
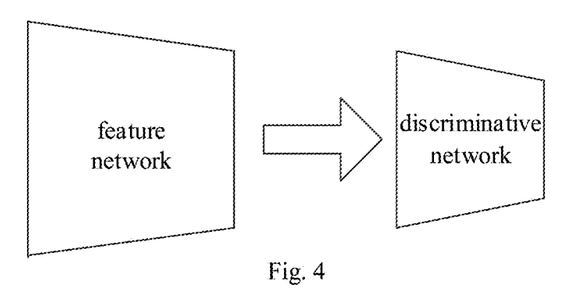
FIG. 4 is a schematic diagram illustrating a trained occluded-image detection model according to an exemplary embodiment.

FIG. 4 illustrates a trained occluded-image detection model including a feature network and a classification network. An image to be detected is input into the trained occluded-image detection model. It is determined whether the image to be detected is an occluded image based on an occlusion characteristic about an image in the occluded-image detection model, and a detection result is output.

In this embodiment, the generation feature is optimized only for the classification network of the occluded-image detection model, and it does not need to be optimized for the whole network. Compared with the overall optimization, the cost of optimization in this embodiment is much smaller both in terms of computing resources and time costs. Therefore, the additional training cost introduced is relatively small. During the training, the existing occlusion detection model can be fully used with only a few parameters fine-tuned, thus extra cost is small. In addition, a classification task may be modeled as problems of feature extraction and feature classification, therefore, the method of optimizing the feature classification network after feature augmentation according to the present disclosure may also be adopted for other classification tasks. Therefore, this method has high expansibility and universality and can be easily extended to other classification tasks.

In an alternative embodiment, the occluded-image detection model is a convolutional neural network model.

In detail, the convolutional neural network model may adopt shufflenetv2. This network model has fewer parameters and can save a lot of storage and computing resources.

In an alternative embodiment, the data feature augmentation network is a generative adversarial network.

The data feature augmentation network is a generative adversarial network. In detail, the data feature augmentation network may be a self-attention generative adversarial network. As known to those skilled in the art, the generative adversarial network include a generative network and a discriminant network.

Figure 5:
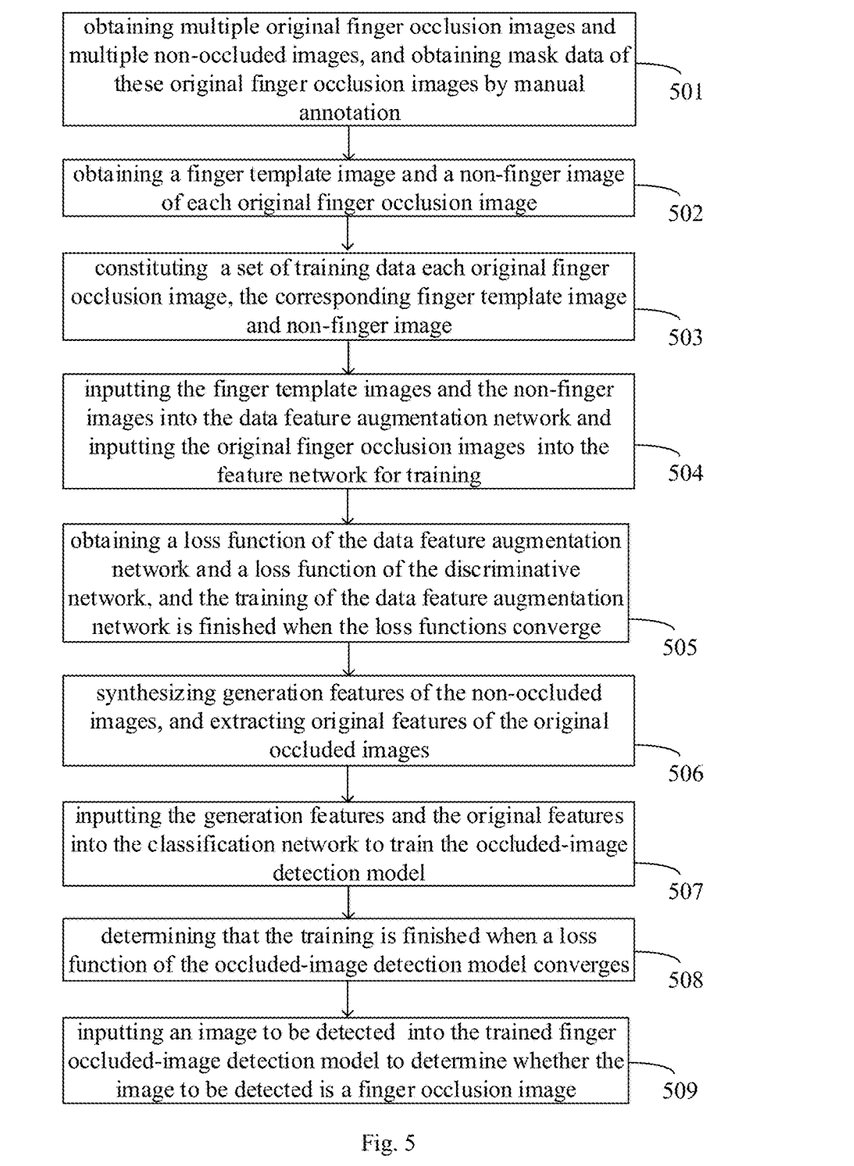
FIG. 5 is a flow chart showing a method for detecting an occluded image, according to an exemplary embodiment.

Specific embodiments of detection of an occluded image detection according to the present disclosure are described in detail below. The data feature augmentation network is a self-attention generative adversarial network. The occluded-image detection model is a ShuffleNetv2 network model. The occluded image is a finger occlusion image, also called an occluded-by-finger image. As illustrated in FIG. 5, this embodiment includes the following.

At block 501, multiple original finger occlusion images and multiple non-occluded images are obtained, and mask data of these original finger occlusion images are obtained by manual annotation.

At block 502, a finger template image and a non-finger image of each original finger occlusion image are obtained based on the original finger occlusion images and corresponding mask data.

At block 503, each original finger occlusion image, the corresponding finger template image and non-finger image constitute a set of training data.

At block 504, several sets of training data are randomly selected from the training data obtained above in each round of training of the data feature augmentation network, and the finger template images and the non-finger images are input into the data feature augmentation network and the original finger occlusion images are input into the feature network for training.

At block 505, a loss function of the data feature augmentation network and a loss function of the discriminative network in each round of training are obtained, and it is determined that the training of the data feature augmentation network is finished when the loss functions converge.

At block 506, generation features of the non-occluded images are synthesized based on the trained data feature augmentation network, and original features of the original occluded images are extracted based on the feature network.

At block 507, the generation features and the original features are input into the classification network to train the occluded-image detection model.

At block 508, it is determined that the training is finished when a loss function of the occluded-image detection model converges.

At block 509, an image to be detected is input into the trained finger occluded-image detection model to determine whether the image to be detected is a finger occlusion image.

In this embodiment, before detecting the image to be detected by using the trained occluded-image detection model, two training processes are performed. One is training the data feature augmentation network, and the other one is training the occluded-image detection model by using the trained data feature augmentation network. The training of the data feature augmentation network may refer to FIG. 2, and the training of the occluded-image detection model may refer to FIG. 3.

Figure 6:
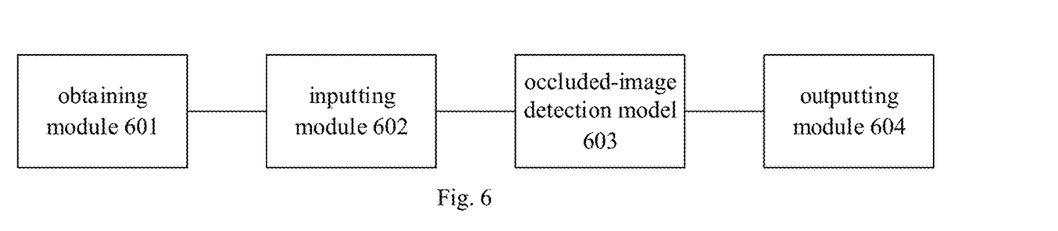
FIG. 6 is a block diagram illustrating an apparatus for detecting an occluded image according to an exemplary embodiment.

The present disclosure further provide an apparatus for detecting an occluded image. As illustrated in FIG. 6, the apparatus includes an obtaining module 601, an inputting module 602, a trained occluded-image detection model 603, and an outputting module 604.

The obtaining module 601 is configured to, after an image is captured by a camera, obtain the image as an image to be detected.

The inputting module 602 is configured to input the image to be detected into a trained occluded-image detection model.

The occluded-image detection model 603 is configured to determine whether the image to be detected is an occluded image based on the occluded-image detection model. The occluded-image detection model is trained based on original occluded images and non-occluded images by using a trained data feature augmentation network.

The outputting module 604 is configured to output an image detection result.

In an alternative embodiment, the occluded-image detection model 603 is trained by a training module. The training module is configured to: obtain the original occluded images and the non-occluded images; train the data feature augmentation network based on the original occluded images; and train the occluded-image detection model based on the original occluded images and the non-occluded images by using the trained data feature augmentation network.

In an alternative embodiment, the training module is further configured to train the data feature augmentation network based on the original occluded images by: generating a finger template image and a non-finger image based on each original occluded image, in which the finger template image is obtained by removing an area not occluded by a finger from the original occluded image, and the non-finger image is obtained by removing an area occluded by the finger from the original occluded image; and generating a plurality of training data sets, in which, each training data set comprises one finger template image, one non-finger image and one original occluded image, and a plurality of training data sets are used to train the data feature augmentation network in each round of training.

In an alternative embodiment, the training module is further configured to generate the finger template image and the non-finger image based on each original occluded image by: obtaining mask data based on the original occluded image, the mask data indicating an occluded location in the original occluded image; and generating the finger template image and the non-finger image based on the original occluded image and the mask data.

In an alternative embodiment, the training module is further configured to train the data feature augmentation network based on the original occluded images by: inputting the finger template image and the non-finger image into the data feature augmentation network to generate a generation feature of the original occluded image; inputting the original occluded image into a feature network to extract an original feature of the original occluded image, the occluded-image detection model including the feature network; inputting the generation feature and the original feature of each original occluded image into a discriminative network for training; obtaining a loss function of the data feature augmentation network and a loss function of the discriminative network in each round of training; and determining that the training of the data feature augmentation network is finished when both the loss function of the data feature augmentation network and the loss function of the discriminative network converge.

In an alternative embodiment, the training module is further configured to train the occluded-image detection model based on the original occluded images and the non-occluded images by using the trained data feature augmentation network by: obtaining a processed non-occluded image based on the mask data and the non-occluded image, wherein the processed non-occluded image is obtained by removing an area corresponding to the mask data from the non-occluded image; inputting the finger template image and the processed non-occluded image into the trained data feature augmentation network to generate a generation feature of the non-occluded image; inputting the original occluded image into a feature network to extract an original feature of the original occluded image, the occluded-image detection model comprising the feature network; inputting the generation feature of the non-occluded image and the original feature of the original occluded image into a classification network for training, the occluded-image detection model comprising the classification network; and determining that the training of the data feature augmentation network is finished when a loss function of the occluded-image detection model converges.

In an alternative embodiment, the occluded-image detection model is a convolutional neural network model.

In an alternative embodiment, the data feature augmentation network is a generative adversarial network.

With respect to the devices in the above embodiments, the specific manners for performing operations for individual modules therein have been described in detail in the embodiments regarding the method embodiments, which will not be elaborated herein.

The method according the present disclosure may have following beneficial effects.

(1) A generative model is stably trained for generating the generation feature by using a small number of finger occlusion images with a mask annotation, so that a problem of insufficient positive samples in the training of finger-occlusion detection model may be effectively solved, and a lot of cost for collecting positive samples may be saved.

(2) By generating a high-level feature of the occluded image, the influence of noise on the model accuracy caused by the lack of detail in image generation may be effectively avoided. Therefore, after the generated feature is added in the training, the detection accuracy is significantly improved.

(3) The only generated features only re-optimize the classification network of the finger occlusion detection model, and the additional training cost introduced is small. In addition, it can make full use of the existing finger occlusion detection model and a few parameters may be fine-tuned with little extra overhead.

(4) The network model has relative smaller number of parameters, thus saving a lot of storage and computing resources.

(5) This method has high expansibility and universality and can be easily extended to other classification tasks.

Figure 7:
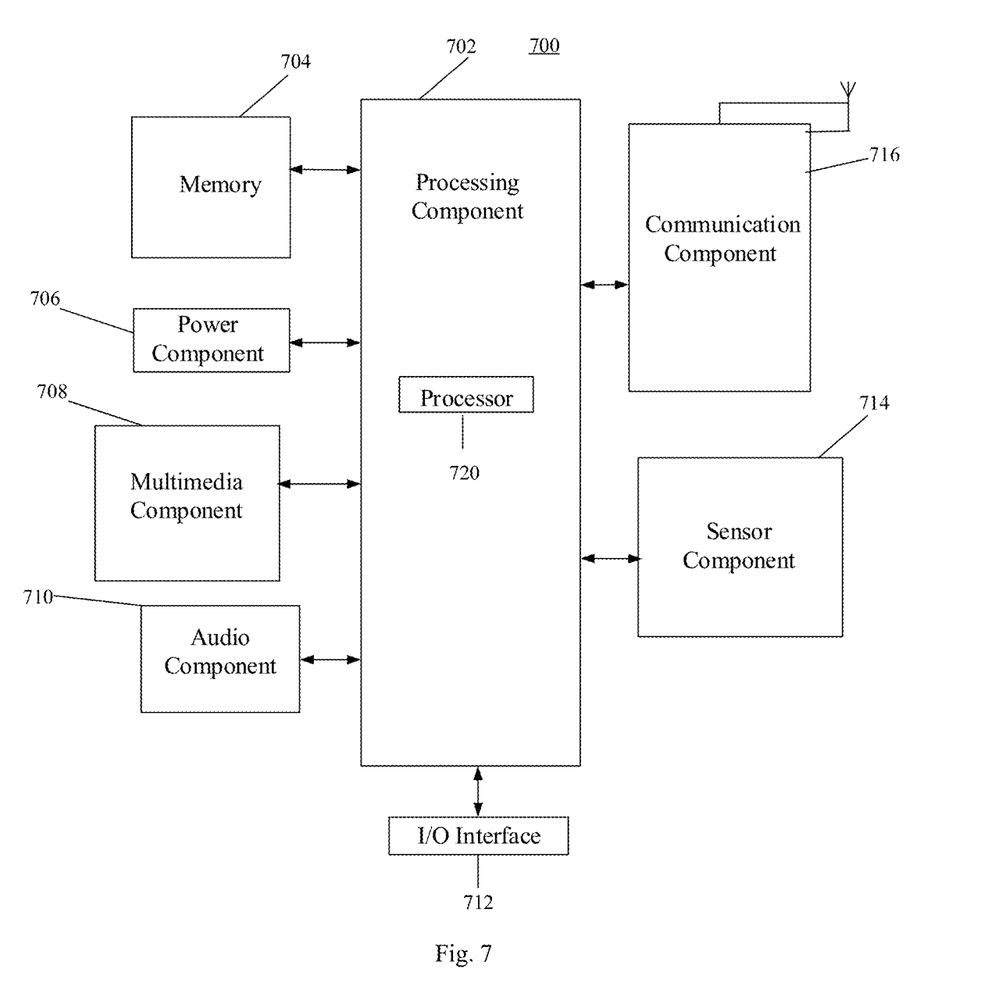
FIG. 7 is a block diagram illustrating a device according to an exemplary embodiment.

FIG. 7 is a block diagram illustrating a device 700 for detecting an occluded image according to an exemplary embodiment.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a mobile terminal, causes the mobile terminal to perform a method for detecting an occluded image. The method includes: after an image is captured by a camera, obtaining the image as an image to be detected; inputting the image to be detected into a trained occluded-image detection model, the occluded-image detection model is trained based on original occluded images and non-occluded images by using a trained data feature augmentation network; determining whether the image to be detected is an occluded image based on the occluded-image detection model; and outputting an image detection result.

Figure 8:
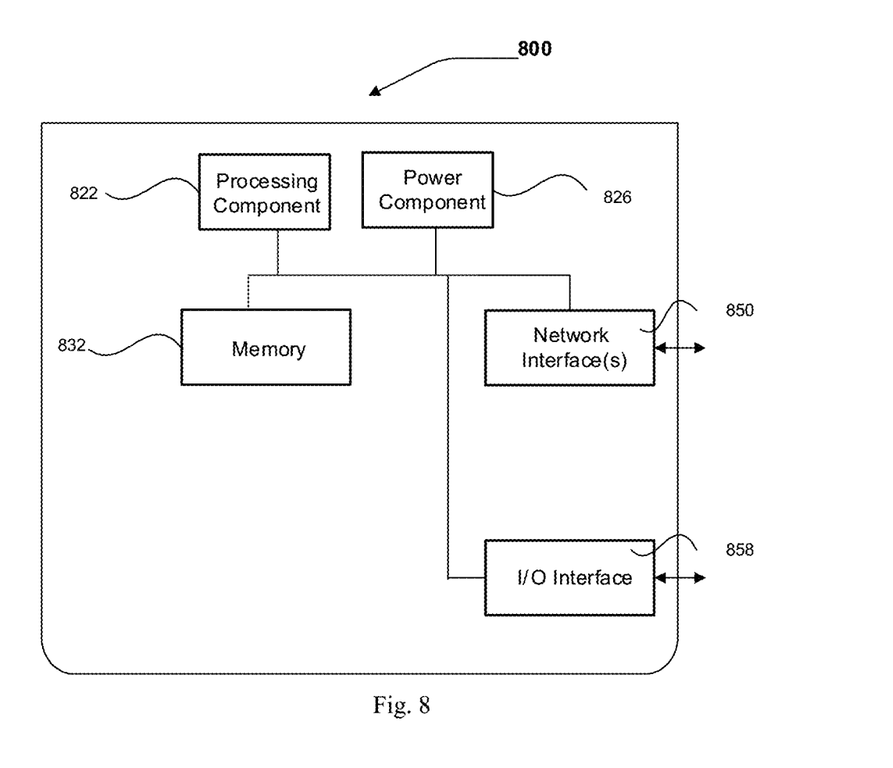
FIG. 8 is a block diagram illustrating a device according to an exemplary embodiment.

FIG. 8 is a block diagram illustrating a device for detecting an occluded image according to an exemplary embodiment. For example, the device 800 may be a server. As illustrated in FIG. 8, the device 800 may include a processing component 822 and memory resource represented by a memory 832. The processing component 822 includes one or more processors. The memory resource is configured to store instructions, such as application programs, executable by the processing component 822. The application programs stored in the memory 832 may include one or more modules. Each module corresponds to a set of instructions. In addition, the processing component 822 is configured to execute instructions to perform above methods: after an image is captured by a camera, obtaining the image as an image to be detected; inputting the image to be detected into a trained occluded-image detection model, the occluded-image detection model is trained based on original occluded images and non-occluded images by using a trained data feature augmentation network; determining whether the image to be detected is an occluded image based on the occluded-image detection model; and outputting an image detection result.

The device 800 may further include a power supply 826 configured to perform the power management of the device 800, a wired or wireless network interfaces 850, and an input/output interfaces 858. The device 800 may operate based on an operating system stored in the memory 832, such as Windows Server™, Mac OS X™, Unix™, Linux™, FreeBSD™, or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for detecting an occluded image, comprising:
after an image is captured by a camera, obtaining the image as an image to be detected;
inputting the image to be detected into a trained occluded-image detection model, wherein, the occluded-image detection model is trained based on original occluded images and non-occluded images by using a trained data feature augmentation network;
determining whether the image to be detected is an occluded image based on the occluded-image detection model; and
outputting an image detection result;
the method further comprising:
obtaining the original occluded images and the non-occluded images;
training the data feature augmentation network based on the original occluded images; and
training the occluded-image detection model based on the original occluded images and the non-occluded images by using the trained data feature augmentation network;
wherein training the data feature augmentation network based on the original occluded images comprises:
generating a finger template image and a non-finger image based on each original occluded image, wherein the finger template image is obtained by removing an area not occluded by a finger from the original occluded image, and the non-finger image is obtained by removing an area occluded by the finger from the original occluded image; and
generating a plurality of training data sets, wherein each training data set comprises one finger template image, one non-finger image and one original occluded image, and a plurality of training data sets are used to train the data feature augmentation network in each round of training;
wherein generating the finger template image and the non-finger image based on each original occluded image comprises:
obtaining mask data based on the original occluded image, the mask data indicating an occluded location in the original occluded image; and
generating the finger template image and the non-finger image based on the original occluded image and the mask data;
wherein training the occluded-image detection model based on the original occluded images and the non-occluded images by using the trained data feature augmentation network comprises:
obtaining a processed non-occluded image based on the mask data and the non-occluded image, wherein the processed non-occluded image is obtained by removing an area corresponding to the mask data from the non-occluded image;
inputting the finger template image and the processed non-occluded image into the trained data feature augmentation network to generate a generation feature of the non-occluded image;
inputting the original occluded image into a feature network to extract an original feature of the original occluded image, the occluded-image detection model comprising the feature network;
inputting the generation feature of the non-occluded image and the original feature of the original occluded image into a classification network for training, the occluded-image detection model comprising the classification network; and
determining that the training of the data feature augmentation network is finished when a loss function of the occluded-image detection model converges.

2. The method of claim 1, wherein training the data feature augmentation network based on the original occluded images further comprises:
inputting the finger template image and the non-finger image into the data feature augmentation network to generate a generation feature of the original occluded image;
inputting the original occluded image into a feature network to extract an original feature of the original occluded image, the occluded-image detection model comprising the feature network;
inputting the generation feature and the original feature of each original occluded image into a discriminative network for training;

obtaining a loss function of the data feature augmentation network and a loss function of the discriminative network in each round of training; and determining that the training of the data feature augmentation network is finished when both the loss function of the data feature augmentation network and the loss function of the discriminative network converge.

3. The method of claim 1, wherein the occluded-image detection model is a convolutional neural network model.

4. The method of claim 1, wherein the data feature augmentation network is a generative adversarial network.

5. A device for detecting an occluded image, comprising:
a processor; and
a memory configured to store instructions executable by the processor;
wherein the processor is configured to:
after an image is captured by a camera, obtain the image as an image to be detected;
input the image to be detected into a trained occluded-image detection model, wherein, the occluded-image detection model is trained based on original occluded images and non-occluded images by using a trained data feature augmentation network;
determine whether the image to be detected is an occluded image based on the occluded-image detection model; and
output an image detection result;
wherein the processor is configured to:
obtain the original occluded images and the non-occluded images;
train the data feature augmentation network based on the original occluded images; and
train the occluded-image detection model based on the original occluded images and the non-occluded images by using the trained data feature augmentation network;
wherein the processor is configured to:
generate a finger template image and a non-finger image based on each original occluded image, wherein the finger template image is obtained by removing an area not occluded by a finger from the original occluded image, and the non-finger image is obtained by removing an area occluded by the finger from the original occluded image; and
generate a plurality of training data sets, wherein each training data set comprises one finger template image, one non-finger image and one original occluded image, and a plurality of training data sets are used to train the data feature augmentation network in each round of training;
wherein the processor is configured to:
obtain mask data based on the original occluded image, the mask data indicating an occluded location in the original occluded image; and
generate the finger template image and the non-finger image based on the original occluded image and the mask data;
wherein the processor is configured to:
obtain a processed non-occluded image based on the mask data and the non-occluded image, wherein the processed non-occluded image is obtained by removing an area corresponding to the mask data from the non-occluded image;
input the finger template image and the processed non-occluded image into the trained data feature augmentation network to generate a generation feature of the non-occluded image;

input the original occluded image into a feature network to extract an original feature of the original occluded image, the occluded-image detection model comprising the feature network;

input the generation feature of the non-occluded image and the original feature of the original occluded image into a classification network for training, the occluded-image detection model comprising the classification network; and determine that the training of the data feature augmentation network is finished when a loss function of the occluded-image detection model converges.

6. The device of claim 5, wherein the processor is configured to:
input the finger template image and the non-finger image into the data feature augmentation network to generate a generation feature of the original occluded image;
input the original occluded image into a feature network to extract an original feature of the original occluded image, the occluded-image detection model comprising the feature network;
input the generation feature and the original feature of each original occluded image into a discriminative network for training;
obtain a loss function of the data feature augmentation network and a loss function of the discriminative network in each round of training; and
determine that the training of the data feature augmentation network is finished when both the loss function of the data feature augmentation network and the loss function of the discriminative network converge.

7. The device of claim 5, wherein the occluded-image detection model is a convolutional neural network model.

8. The device of claim 5, wherein the data feature augmentation network is a generative adversarial network.

9. A non-transitory computer-readable storage medium having stored therein instructions that, when executed by a processor of a router, causes the router to perform a method for detecting an occluded image, the method comprising:
after an image is captured by a camera, obtaining the image as an image to be detected;
inputting the image to be detected into a trained occluded-image detection model, wherein, the occluded-image detection model is trained based on original occluded images and non-occluded images by using a trained data feature augmentation network;
determining whether the image to be detected is an occluded image based on the occluded-image detection model; and
outputting an image detection result;
the method further comprising:
obtaining the original occluded images and the non-occluded images;
training the data feature augmentation network based on the original occluded images; and
training the occluded-image detection model based on the original occluded images and the non-occluded images by using the trained data feature augmentation network;
wherein training the data feature augmentation network based on the original occluded images comprises:
generating a finger template image and a non-finger image based on each original occluded image, wherein the finger template image is obtained by removing an area not occluded by a finger from the original occluded image, and the non-finger image is obtained by removing an area occluded by the finger from the original occluded image; and generating a plurality of training data sets, wherein each training data set comprises one finger template image, one non-finger image and one original occluded image, and a plurality of training data sets are used to train the data feature augmentation network in each round of training;

wherein generating the finger template image and the non-finger image based on each original occluded image comprises:

obtaining mask data based on the original occluded image, the mask data indicating an occluded location in the original occluded image; and generating the finger template image and the non-finger image based on the original occluded image and the mask data;

wherein training the occluded-image detection model based on the original occluded images and the non-occluded images by using the trained data feature augmentation network comprises:

obtaining a processed non-occluded image based on the mask data and the non-occluded image, wherein the processed non-occluded image is obtained by removing an area corresponding to the mask data from the non-occluded image;

inputting the finger template image and the processed non-occluded image into the trained data feature augmentation network to generate a generation feature of the non-occluded image;

inputting the original occluded image into a feature network to extract an original feature of the original occluded image, the occluded-image detection model comprising the feature network;

inputting the generation feature of the non-occluded image and the original feature of the original occluded image into a classification network for training, the occluded-image detection model comprising the classification network; and determining that the training of the data feature augmentation network is finished when a loss function of the occluded-image detection model converges.

* * * * *